United States Patent [19]

Nicoli et al.

[11] Patent Number: 4,805,856
[45] Date of Patent: Feb. 21, 1989

[54] CABLE MOUNT

[75] Inventors: Robert Nicoli, Glenwood; Karl S. Clauson, Orland Park, both of Ill.

[73] Assignee: Panduit Corp., Tinley Park, Ill.

[21] Appl. No.: 139,529

[22] Filed: Dec. 29, 1987

[51] Int. Cl.$^4$ .......................... F16L 3/08; B65D 63/00
[52] U.S. Cl. .................................. 248/74.3; 24/16 PB
[58] Field of Search ................. 248/74.3, 70, 60, 74.2, 248/316.1; 24/17 A, 17 AP, 16 PB, 30.5 P

[56] References Cited

U.S. PATENT DOCUMENTS

| | | | |
|---|---|---|---|
| 3,149,808 | 9/1964 | Weckesser | 248/74.3 |
| 3,454,249 | 7/1969 | Geisinger | 248/74.3 X |
| 3,471,109 | 10/1969 | Meyer | 24/16 PB X |
| 3,542,321 | 5/1968 | Kahabka . | |
| 3,568,262 | 3/1971 | Woldman | 248/74.3 X |
| 3,672,615 | 6/1972 | Fiorentino | 248/74.3 |
| 3,855,669 | 12/1974 | Meyer | 24/16 PB |
| 3,908,233 | 9/1975 | Caveney et al. . | |
| 3,913,876 | 10/1975 | McSherry | 248/74.3 |
| 4,272,047 | 6/1981 | Botka | 248/74.3 |
| 4,389,754 | 6/1983 | Sohma | 24/17 AP X |
| 4,490,886 | 1/1985 | Omata | 248/74.3 X |

FOREIGN PATENT DOCUMENTS 1005269 9/1963 United Kingdom ............. 24/16 PB

Primary Examiner—Ramon S. Britts
Assistant Examiner—Karen J. Chotkowski
Attorney, Agent, or Firm—Charles R. Wentzel; Mark D. Hilliard

[57] ABSTRACT

A cable mount for securing a bundle of cables to a mounting surface is integrally molded with a high strength releasable cable tie portion joined at its head to a surface mountable support plate by a flexible hinge adjacent a strap positioning and securing channel. Insertion of the tip of the strap of the cable tie portion into the channel automatically aligns the head of the cable tie to accept the strap guided thereto by the channel and lock the strap within the head to secure the bundle of cables to the mount.

9 Claims, 2 Drawing Sheets

CABLE MOUNT

TECHNICAL FIELD

The present invention relates to a fastener for securing bundles of wires or the like to a mounting surface.

BACKGROUND ART

Although many varieties of fasteners have been proposed to secure multiple wires into a bundle, the great majority of one-piece fasteners utilized today for bundling wires are of the general type disclosed in commonly assigned U.S. Pat. No. 3,908,233 to Caveney et al. This type of integrally molded plastic cable tie has a locking head and a strap portion secured within the head and is preferred in the art because it can be economically manufactured to provide a fastener that requires a minimal insertion force while possessing a high locking strength to securely bundle conductors enclosed therein. The cable tie disclosed in the '233 patent includes structural features that enable the strap to be released from the locking head when desired to enable the cable tie to be reused after an initial application.

Often it is desirable to attach a wire bundle to a mounting surface devoid of structural attachment features. A variety of cable tie supports have been proposed for securing a cable tie to the mounting surface. Reference may be had to U.S. Pat. Nos. 3,542,321, 3,672,615, and 3,913,876.

These supports typically comprise a plate that has an adhesive layer or mounting holes for securing the support to a mounting surface. These supports provide a structural means for locking the head of a cable tie to the support to form an interconnected unit. A wire bundle can then be effectively positioned relative to the interlocked cable tie and support, encircled with the strap of the cable tie and secured to the support by locking the strap within the head of the cable tie. These prior supports thus require careful manipulation of a loose piece cable tie into locking engagement with a support and the subsequent careful threading of the strap into the cable tie head.

SUMMARY OF THE INVENTION

The object of the present invention is to provide a one-piece high strength cable mount that can be securely attached to a mounting surface, simply and quickly manipulated to encircle and secure a bundle of conductors disposed adjacent thereto, and economically manufactured as an integral part.

In general a cable mount includes a high strength cable tie, having a strap with a free end and an opposite end joined to a strap locking head, the locking head having a strap receiving opening therein; a support plate including channel means formed on a surface of the support plate for positioning the strap and securing the strap to the support plate; a mounting means for securing the support plate to a mounting surface; and a flexible hinge joining the head of the cable tie to the support plate.

DESCRIPTION OF THE PREFERRED EMBODIMENT

Figure 1:
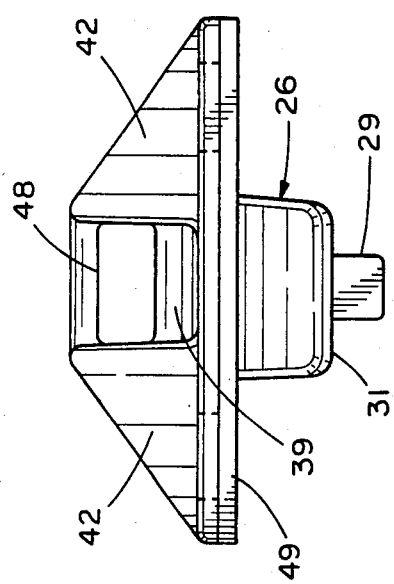
FIG. 1 is a perspective view of a cable mount embodying the concept of the present invention as seen fastening a bundle of cables to a mounting surface.
Figure 2:
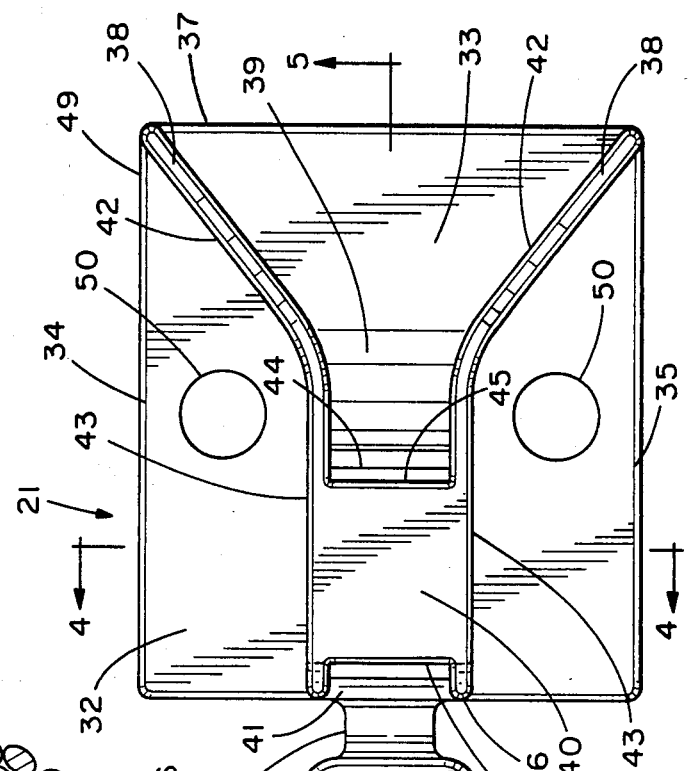
FIG. 2 is a rear view of the cable mount of FIG. 1.

A cable mount embodying the concept of the present invention is designated generally by the number 20 in the accompanying drawings. Cable mount 20 includes a support plate 21 connected to a high strength releasable cable tie 22 by a hinge 23. The cable mount 20 is injection molded of a suitable thermoplastic as is known in the art, with nylon being the preferred thermoplastic material. Cable mount 20 is molded as an integral unit to form support plate 21, hinge 23 and cable tie 22.

Cable tie 22 is similar in construction to the releasable cable tie disclosed in commonly assigned U.S. Pat. No. 3,908,233, the teachings of which are incorporated by reference herein. Cable tie 22 includes a strap 24 having a row of teeth 25 disposed along an inner surface thereof, and a locking head 26.

Locking head 26 includes an integral locking pawl 27 formed within a strap receiving opening 28 which presents a release lever 29 that unlocks pawl 27 from teeth 25 to allow removal of strap 24 from head 26. Head 26 includes strap entry face 30 disposed on a side of cable tie 22 common to the row of teeth 25 and a strap exit face 31 on the opposite side of cable tie 22.

Support plate 21 includes a plate portion 32 upon which is formed a strap channel 33. Support plate 21 is rectangular in shape having parallel, opposed first and second lateral edges 34 and 35 and parallel, opposed inner and outer edges 36 and 37.

Strap channel 33 is defined by opposed strap guide walls 38, ramp 39, bridge 40 and panel 41 formed in raised relief on the surface of plate portion 32. Strap guide walls 38 include wing portions 42 that converge inwardly and project upwardly from outer corners of plate portion 32 to extend in parallel, constant height sections 43 towards inner edge 36; parallel sections 43 being spaced apart an amount sufficient to accommodate and guide strap 24 into strap receiving opening 28 when strap 24 is inserted into strap channel 33. Strap channel 33 is disposed in alignment with the longitudinal axis of strap 24 of cable tie 22.

Planar bridge 40 connects the upper edges of adjacent parallel sections 43 of walls 38 beginning at a point spaced inwardly from inner edge 36 of plate portion 32 and extending approximately half the extent of parallel sections 43. Planar ramp 39 connects the lower edges of guide walls 38 extending from the surface of plate portion 32, upwardly, away from plate portion 32, to a line 44 spaced from an outer edge 45 of bridge 40.

Planar panel 41 joins adjacent parallel sections 43 of guide walls 38 and a portion of inner edge 36 of plate portion 32. Panel 41 is disposed perpendicular to the plane of plate portion 32 and extends upwardly approximately one third the height of guide walls 38, an amount sufficient to form, in combination with inner terminal edges 46 of guide walls 38 and an inner terminal edge 47 of bridge 40 a channel exit window 48.

Figure 3:
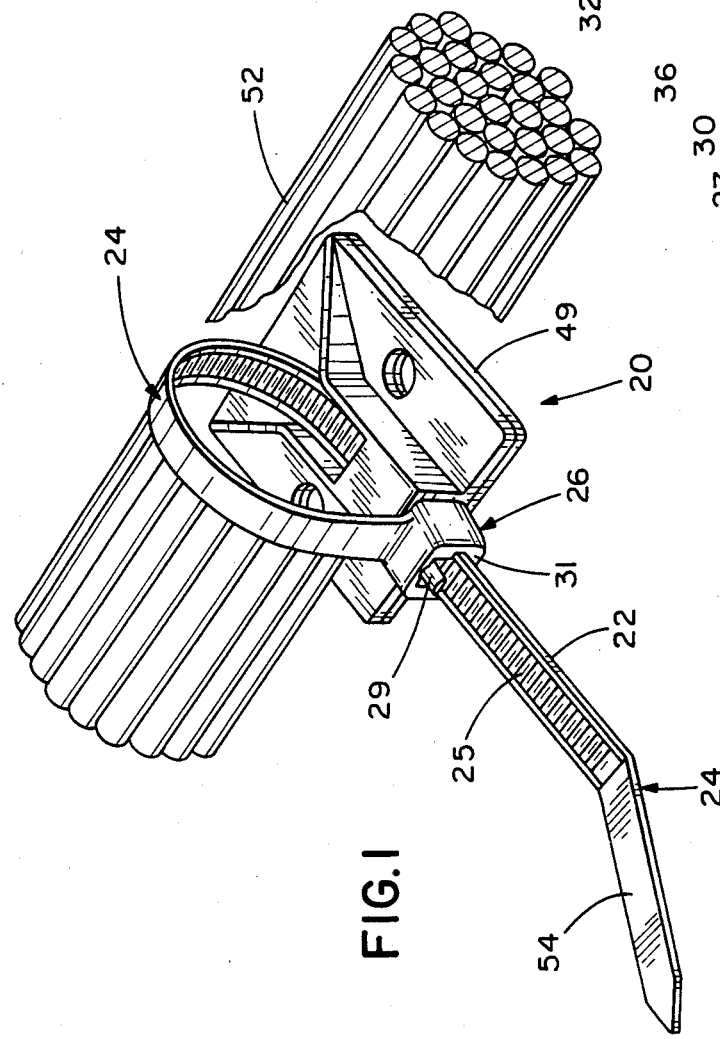
FIG. 3 is a plan view of the cable mount of FIG. 2.
Figure 4:
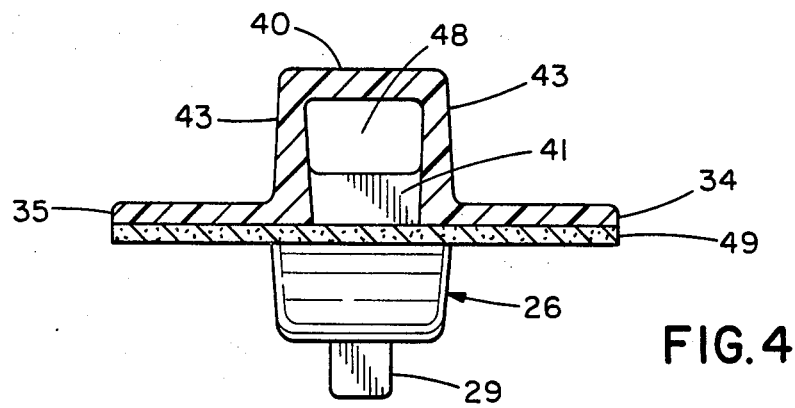
FIG. 4 is a sectional view of the cable mount of FIG. 1 taken along line 4—4 of FIG. 3.
Figure 5:
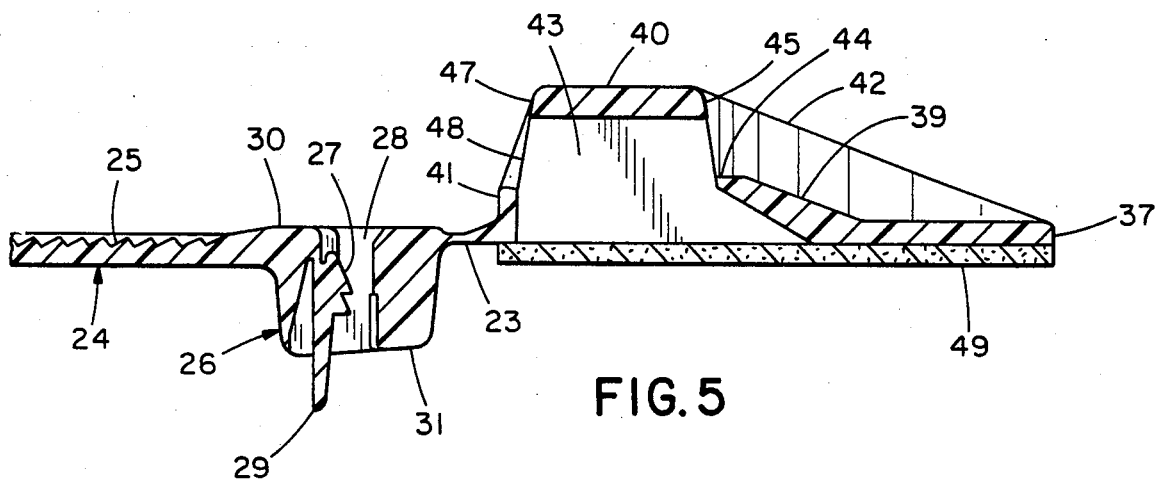
FIG. 5 is a fragmentary sectional of the cable mount of FIG 1 taken along line 5—5 of FIG. 3.
Figure 6:
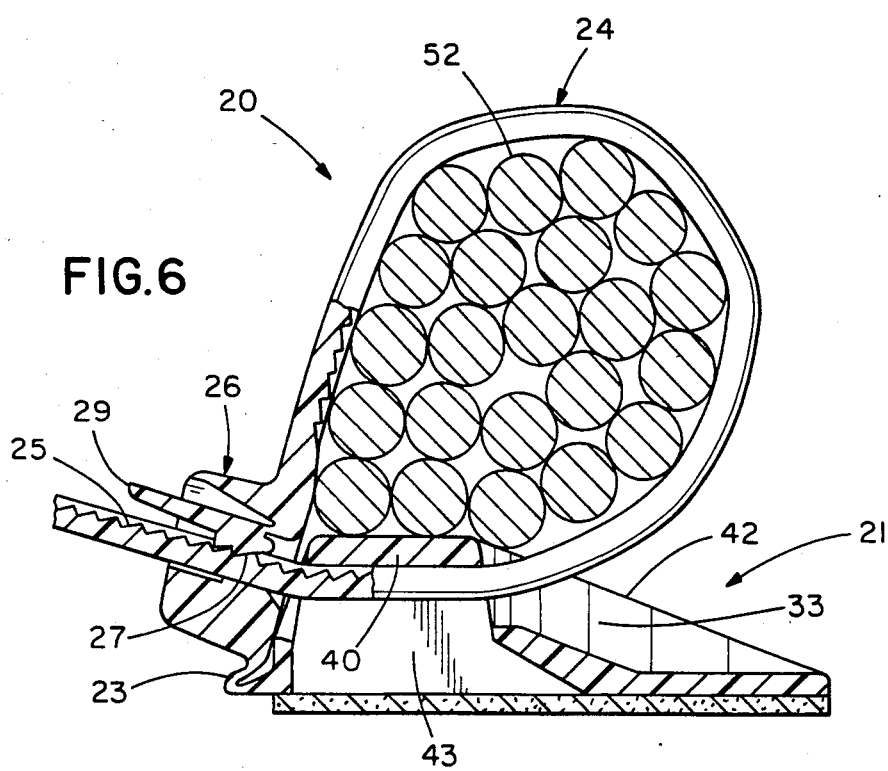
FIG. 6 is a fragmentary sectional view of the cable mount of FIG. 1.

Head 26 of cable tie 22 is joined to the inner edge of plate portion 32 by hinge 23. Hinge 23 is formed as a thin flexible member, aligned with and disposed between aligned cable tie 22 and strap channel 33. Hinge 23 is of sufficient length and flexibility to allow cable tie 22 to be rotated approximately 105 degrees from its as molded position, best shown in FIGS. 3 and 5, to a second position, best shown in FIGS. 1 and 6, where strap receiving opening 28 of head 26 is adjacent to and aligned with channel exit window 48. In preferred form, as seen in FIG. 6, the length of hinge 23 and the contour of cable tie 22 and support plate 21 are chosen to ensure that when the cable mount 20 is mounted to a surface and secured around a bundle of cables strap entry face 30 of head 26 is rotated beyond 90° of its as molded orientation, which is parallel to the plane of support plate 21, thus directing strap receiving opening 28 upwardly, away from the support surface. The upwardly directed disposition of opening 28 directs a tip of a strap inserted therein upwardly, away from the support surface facilitating the manipulation of strap during installation and also facilitating later manipulation of release lever 29.

Coextensive with support plate 21 on the side of surface portion 32 adjacent the support mounting surface is a lamina 49 of pressure sensitive foam adhesive tape for securing support plate 21 to a mounting surface. A coextensive sheet of release paper (not shown) can be utilized to cover the adhesive surface of lamina 49. Also formed in the surface of plate portion 32 are holes 50 that can be utilized to secure cable mount 20 to a mounting surface with mounting fasteners.

As best seen in FIG. 6, application of cable mount 20 is accomplished by affixing mount 20 to a support surface by its integral adhesive layer or by appropriate fasteners, grasping strap 24, encircling a bundle of cables 52 with strap 24 and directing strap 24 through channel 33 into locking engagement with cable tie head 26; manipulation of tip 54 of cable tie strap 24 around a bundle automatically aligning strap receiving opening 28 with exit window 48 to ensure accurate insertion of strap 24 through channel 33 into locking engagement with head 26. In preferred form tip 54 of cable tie 22 is molded to form a 25 degree angle to the plane of strap 24, directed upwardly away from strap entry face 30 to facilitate the manipulation of strap 24 during application and to facilitate upward insertion of tip 52 through strap channel 33 and locking head 26.

We claim:
1. A cable mount, comprising:
   a high strength cable tie, including a strap having a free end and an opposite end joined to a strap locking head, the locking head having a strap receiving opening therein;
   a support plate including channel means formed on the support plate for positioning the strap and securing the strap to the support plate;
   a mounting means for securing the support plate to a mounting surface; and
   a flexible hinge disposed between the strap locking head of the high strength cable tie and the support plate joining the head of the cable tie to the support plate.

2. A cable mount as set forth in claim 1, wherein the cable mount is integrally formed.

3. A cable mount as set forth in claim 2, wherein the channel means includes a strap channel having opposed strap guide walls joined along a portion thereof by a planar bridge to define an exit window and wherein the hinge is positioned adjacent the exit window of the channel such that the exit window and the strap receiving opening of the cable tie are automatically brought into alignment when the free end of the cable tie is directed into the channel, whereby a strap inserted through the channel and the exit window is directed into the strap receiving opening of the head of the cable tie.

4. A cable mount as set forth in claim 3 wherein the strap and the support plate of the cable mount are formed in substantially parallel planes and wherein the strap is in alignment with the channel.

5. A cable mount as set forth in claim 4 wherein the hinge is of sufficient length to allow more than ninety degrees of rotation of the head of the cable tie from its as molded disposition and wherein the exit window is directed upwardly, away from the mounting surface whereby the free end of the strap secured therein is directed upwardly to facilitate manipulation thereof.

6. A cable mount as set forth in claim 5 wherein a portion of the free end of the strap is formed transverse to the plane of the strap.

7. A cable mount as set forth in claim 6 wherein the strap guide walls include converging wing portions.

8. A cable mount as set forth in claim 7 wherein the mounting means includes a lamina of pressure sensitive adhesive.

9. A cable mount as set forth in claim 7 wherein the mounting means includes fastener accepting holes in the support plate.

* * * * *